(12) United States Patent
Chen et al.

(10) Patent No.: US 10,349,083 B2
(45) Date of Patent: Jul. 9, 2019

(54) METHOD FOR LOW-LATENCY ILLUMINATION COMPENSATION PROCESS AND DEPTH LOOKUP TABLE BASED CODING

(71) Applicant: HFI Innovation Inc., Zhubei, Hsinchu County (TW)

(72) Inventors: Yi-Wen Chen, Taichung (TW); Kai Zhang, Beijing (CN); Jian-Liang Lin, Su'ao Township, Yilan County (TW); Yu-Wen Huang, Taipei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 301 days.

(21) Appl. No.: 15/121,142

(22) PCT Filed: Mar. 17, 2015

(86) PCT No.: PCT/CN2015/074371
§ 371 (c)(1),
(2) Date: Aug. 24, 2016

(87) PCT Pub. No.: WO2015/139605
PCT Pub. Date: Sep. 24, 2015

(65) Prior Publication Data
US 2017/0013276 A1    Jan. 12, 2017

(30) Foreign Application Priority Data

Mar. 17, 2014   (WO) ................ PCT/CN2014/073555

(51) Int. Cl.
*H04N 19/597*   (2014.01)
*H04N 19/105*   (2014.01)
(Continued)

(52) U.S. Cl.
CPC ......... *H04N 19/597* (2014.11); *H04N 19/105* (2014.11); *H04N 19/136* (2014.11);
(Continued)

(58) Field of Classification Search
CPC ... H04N 19/597; H04N 19/136; H04N 19/174
(Continued)

(56) References Cited

U.S. PATENT DOCUMENTS

| 8,259,792 B2 | 9/2012 | Joung et al. |
| 8,774,282 B2 | 7/2014 | Song |

(Continued)

FOREIGN PATENT DOCUMENTS

| CN | 101193302 | 6/2008 |
| CN | 101529921 A | 9/2009 |

(Continued)

OTHER PUBLICATIONS

Tech, G., et al.; "3D-HEVC Draft Text 3;" Joint Collaborative Team on 3D Video Coding Extension Development of ITU-T SG 16 WP 3 and ISO/IEC JTC 1/SC 29/WG 11; Jan. 2014; pp. 1-111.
(Continued)

*Primary Examiner* — Jeremiah C Hallenbeck-Huber
(74) *Attorney, Agent, or Firm* — McClure, Qualey & Rodack, LLP (57) ABSTRACT

A method and apparatus for low-latency illumination compensation in a three-dimensional (3D) and multi-view coding system are disclosed. According to the present invention, the encoder determines whether to enable or disable the illumination compensation for the current picture or slice based on a condition related to statistic associated with a selected reference picture or slice respectively, or related to high-level coding information associated with the current picture or slice respectively. The high-level coding information associated with the current picture or slice excludes any
(Continued)

information related to pixel values of the current picture or slice respectively. The illumination compensation is them applied according to the decision made by the encoder. A similar low-latency method is also applied for depth lookup table (DLT) based coding.

20 Claims, 5 Drawing Sheets

(51) Int. Cl.
    *H04N 19/176* (2014.01)
    *H04N 19/46* (2014.01)
    *H04N 19/136* (2014.01)
    *H04N 19/174* (2014.01)

(52) U.S. Cl.
    CPC ......... *H04N 19/174* (2014.11); *H04N 19/176* (2014.11); *H04N 19/46* (2014.11)

(58) Field of Classification Search
    USPC .................................................. 375/240.02
    See application file for complete search history.

(56) References Cited

U.S. PATENT DOCUMENTS

| | | | |
|---|---|---|---|
| 9,456,223 B2 | 9/2016 | Kim et al. | |
| 2009/0003455 A1* | 1/2009 | Joung | H04N 19/597 375/240.24 |
| 2009/0010340 A1* | 1/2009 | Joung | H04N 19/597 375/240.24 |
| 2009/0257669 A1* | 10/2009 | Kim | H04N 19/597 382/238 |
| 2010/0118942 A1* | 5/2010 | Pandit | H04N 19/597 375/240.12 |
| 2013/0022111 A1 | 1/2013 | Chen et al. | |
| 2014/0184740 A1* | 7/2014 | Zhang | H04N 19/597 348/43 |

FOREIGN PATENT DOCUMENTS

| | | |
|---|---|---|
| CN | 101710985 | 5/2010 |
| CN | 101711480 | 5/2010 |
| CN | 101715652 | 5/2010 |
| CN | 102609680 A | 7/2012 |

OTHER PUBLICATIONS

Zhang, K., et al.; "3D-CE5.h related Removal of parsing dependency for illumination compensation;" Joint Collaborative Team on 3D Video Coding Extension Development of ITU-T SG 16 WO 3 and ISO/IEC JTC 1/SC 29/WG 11; Apr. 2013; pp. 1-4.

Ikai, T.; "3D-CE5.h related Removal of parsing dependency in illumination compensation;" Joint Collaborative Team on 3D Video Coding Extensions of ITU-T SG 16 WP 3 and ISO/IEC JTC 1/SC 29/WG 11; Apr. 2013; pp. 1-4.

Kang, J., et al.; "CE4.h related Coding of illumination compensation flag;" Joint Collaborative Team on 3D Video Coding Extensions of ITU-TSG 16 WP 3 and ISO/IEC JTC 1/SC 29/WG 11; Jul.-Aug. 2013; pp. 1-10.

International Search Report dated Jun. 17, 2015 issued in application No. PCT/CN2015/074371.

* cited by examiner

METHOD FOR LOW-LATENCY ILLUMINATION COMPENSATION PROCESS AND DEPTH LOOKUP TABLE BASED CODING

CROSS REFERENCE TO RELATED APPLICATIONS

The present invention is a national stage of PCT/CN2015/074371, filed Mar. 17, 2015, which claims priority to PCT Patent Application, Serial No. PCT/CN2014/073555, filed on Mar. 17, 2014. The PCT Patent Application is hereby incorporated by reference in its entirety.

FIELD OF THE INVENTION

The present invention relates to three-dimensional and multi-view video coding. In particular, the present invention relates to method for low-latency illumination compensation process and Depth Lookup Table based coding.

BACKGROUND AND RELATED ART

Three-dimensional (3D) television has been a technology trend in recent years that is targeted to bring viewers sensational viewing experience. Multi-view video is a technique to capture and render 3D video. The multi-view video is typically created by capturing a scene using multiple cameras simultaneously, where the multiple cameras are properly located so that each camera captures the scene from one viewpoint. The multi-view video with a large number of video sequences associated with the views represents a massive amount data. Accordingly, the multi-view video will require a large storage space to store and/or a high bandwidth to transmit. Therefore, multi-view video coding techniques have been developed in the field to reduce the required storage space and the transmission bandwidth. A straightforward approach may simply apply conventional video coding techniques to each single-view video sequence independently and disregard any correlation among different views. Such straightforward techniques would result in poor coding performance. In order to improve multi-view video coding efficiency, multi-view video coding always exploits inter-view redundancy. The disparity between two views is caused by the locations and angles of the two respective cameras.

Figure 1:
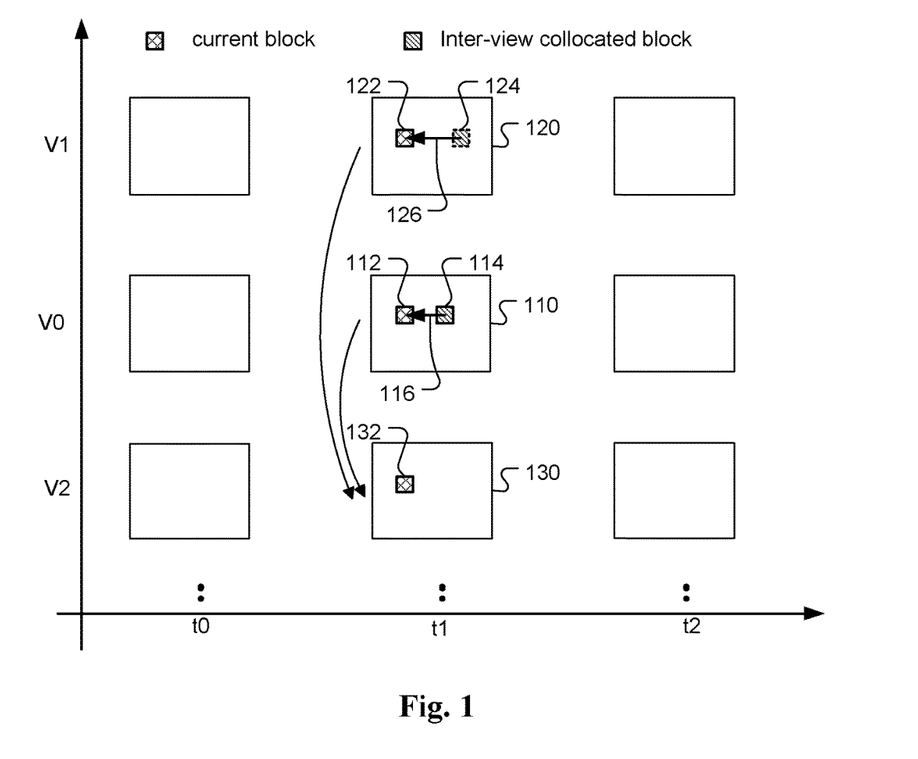
FIG. 1 illustrates an example of three-dimensional/multi-view coding, where motion compensated prediction (MCP) and disparity compensated prediction (DCP) are used.

FIG. 1 shows an exemplary prediction structure used in the common test conditions for 3D video coding. The video pictures and depth maps corresponding to a particular camera position are indicated by a view identifier (i.e., V0, V1 and V2 in FIG. 1). All texture pictures and depth maps that belong to the same camera position are associated with the same viewId (i.e., view identifier). The view identifiers are used for specifying the coding order within the access units and detecting missing views in error-prone environments. An access unit includes all video pictures and depth maps corresponding to the same time instant. Inside an access unit, the video picture and, when present, the associated depth map having viewId equal to 0 are coded first, followed by the video picture and depth map having viewId equal to 1, etc. The view with viewId equal to 0 (i.e., V0 in FIG. 1) is also referred to as the base view or the independent view. The base view video pictures can be coded using a conventional HEVC video coder without dependence on other views.

The example shown in FIG. 1 corresponds to a view coding order from V0 (i.e., base view) to V1, and followed by V2. The current block in the current picture being coded is in V2. According to HTM-6.0, all the MVs of reference blocks in the previously coded views can be considered as an inter-view candidate. In FIG. 1, frames 110, 120 and 130 correspond to a video picture or a depth map from views V0, V1 and V2 at time t1 respectively. Block 132 is the current block in the current view, and blocks 112 and 122 are the current blocks in V0 and V1 respectively. For current block 112 in V0, a disparity vector (116) is used to locate the inter-view collocated block (114). Similarly, for current block 122 in V1, a disparity vector (126) is used to locate the inter-view collocated block (124).

Illumination Compensation (IC)

Illumination compensation (IC) is a technique to reduce the intensity differences between views caused by the different light fields of two views captured by different cameras at different locations. In HTM, a linear IC model is disclosed by Liu et al. ("3D-CE2.h: Results of Illumination Compensation for Inter-View Prediction", Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, Document: JCT3V-B0045) to compensate the illumination discrepancy between different views. Parameters in IC model are estimated for each prediction unit (PU) using available nearest reconstructed neighbouring pixels. Therefore, there is no need to transmit the IC parameters to the decoder. Whether to apply IC or not is decided at the coding unit (CU) level, and an IC flag is coded to indicate whether IC is enabled at the CU level. The flag is present only for the CUs that are coded using inter-view prediction. If IC is enabled for a CU and a PU within the CU is coded by temporal prediction (i.e., Inter prediction), the PU block is inferred to have IC disabled. The linear IC model used in inter-view prediction is shown in eqn. (1):

$$p(i,j)=a_{IC} \cdot r(d+dv_x, j+dv_y)+b_{IC} \text{ where}(i,j) \in PU_c \quad (1)$$

where $PU_c$ is the current PU, (i, j) is the pixel coordinate in $PU_c$, $(dv_x, dv_y)$ is the disparity vector of $PU_c$, p(i, j) is the prediction of PUc, (r•,•) is the reference picture of PU from a neighboring view, and $a_{IC}$ and $b_{IC}$ are parameters of the linear IC model.

Figure 2:
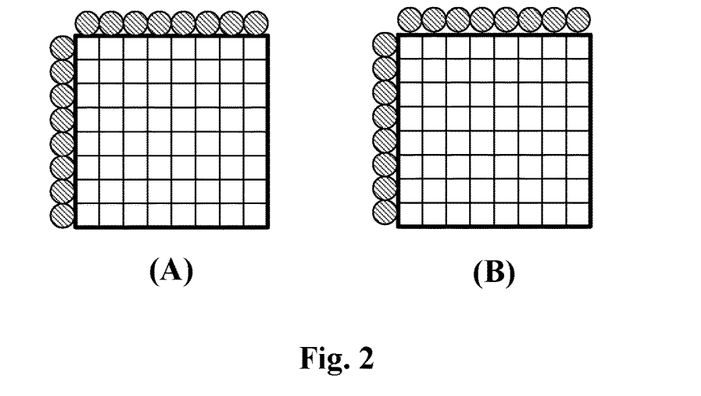
FIG. 2 illustrates an example of neighboring pixels of a current block and a reference block being used to derive the illumination compensation parameters.

To estimate parameters $a_{IC}$ and $b_{IC}$ for a PU, two set of pixels as shown in FIG. 2A and FIG. 2B are used. As shown in FIG. 2A, the neighboring pixels consists of reconstructed neighboring pixels in the left column and in the above row (shown as circles) of the current CU (indicated by thick lined box), where the CU that contains the current PU. As shown in FIG. 2B, the other set of pixels correspond to neighboring pixels (shown as circles) of a reference block (indicated by thick lined box) of the current CU. The reference block of the current CU is located by using the location of the current PU and the disparity vector of the current PU.

An adaptive luminance compensation tool for inter-view video coding is disclosed by Mishurovskiy et al. ("CE2.A results on inter-view coding with adaptive luminance compensation," Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, Document: JCT3V-B0031). This adaptive luminance compensation is only applied to P slices. A macroblock (MB) level flag is transmitted for a Skip MB, P16×16, P16×8, P8×16 and P8×8 MB to turn the adaptive luminance compensation On or Off.

Signaling of IC

Whether illumination compensation is used is signaled in the coding unit level. In Skip/Merge mode, ic_flag is conditionally sent depending on merge_idx and the slice segment header flag slice_ic_disable_merge_zero_idx_flag. If ic_flag is not sent in Merge mode, ic_flag is inferred to be 0. In 3D-HEVC (Three-Dimensional Video Coding based on High Efficiency Video Coding) test model, HTM-7.0, a process is used to derive a disparity vector predictor, known as NBDV (Neighboring Block Disparity Vector). The disparity vector derived from NBDV is then used to fetch a depth block in the depth image of the reference view. The fetched depth block will have the same size as the current prediction unit (PU), and it will then be used to perform backward warping for the current PU.

When merge_idx is equal to 0, the temporal inter-view motion predictor candidate is typically used. The inter-view prediction is not used very often in this case. To reduce the overhead of associated with signaling the ic_flag in this case of merge_idx being 0, the illumination compensation is not allowed. This system configuration is indicated by setting the value of a control flag (e.g., slice_ic_disable_merge_zero_idx_flag) to 1 in the slice level. For some pictures that the inter-view prediction may be frequently used, the above assumption does not hold. In this case, the merge_idx based ic_flag skipping is only applied under the condition that (POC % IntraPeriod) is not 0, where POC corresponds to Picture Order Count. This POC based decision is made by the encoder. The encoder can indicate the decision regarding whether to enable the ic_flag skipping in this case of merge_idx being 0 by sending a slice header flag (e.g., slice_ic_disable_merge_zero_idx_flag). This allows the encoder to control the condition depending on coding structure or sequences. In addition, for an inter-coded PU, illumination compensation is always disabled when Advanced Residual Prediction (ARP) is applied. Therefore, when the ARP weighting factor for an inter-coded PU is not equal to 0, the signaling of ic_flag is skipped and its value is set to 0.

Encoding of IC

According to the current HTM, the encoder decides whether the IC is enabled for the current slice/picture. The decision is made based on statistics of the pixels of the current picture and pixels of the inter-view reference picture. Therefore, the decision cannot be made until the statistics are collected, which introduces a latency of at least one slice when the IC control flag is signaled in the slice level.

In particular, the encoder will first check if there is any inter-view reference picture in the reference picture list of current slice/picture according to the current HTM. If no inter-view reference picture in the reference list, the IC will be turned Off for the current slice/picture. If at least one inter-view reference picture exists in the reference list, it will derive two histograms of pixel values based on the current picture and the inter-view reference picture. After the two histograms are derived, a summation of the absolute differences (SAD) between corresponding entries of the two histograms is calculated. If the summation of absolute differences value is larger than a predefined threshold, IC is enabled for the current slice/picture. Otherwise, IC is disabled for the current slice.

Depth Lookup Table (DLT)

Figure 3:
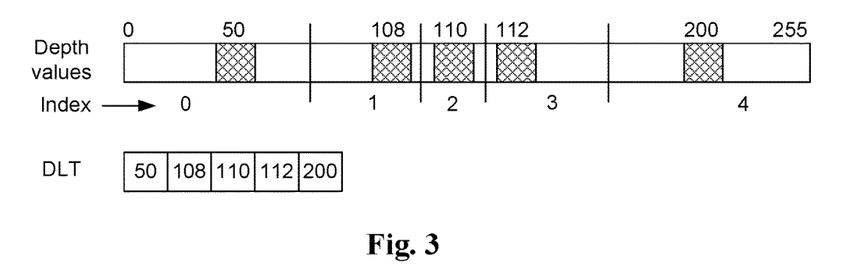
FIG. 3 illustrates an exemplary depth lookup table (DLT) including 5 appearing depth values corresponding to 50, 108, 110, 112 and 200 represented by indexes from 0 to 4.

Depth lookup table (DLT) has been adopted into 3D-HEVC. Very often, there are only limited values appearing in the depth component. Therefore, DLT is a compact representation of the valid values in a block. When a CU is coded in Intra simplified depth coding (SDC) mode or depth map modeling (DMM) mode, DLT is used to map the valid depth values to DLT indexes. FIG. 3 demonstrates an example of DLT representation of depth values in a picture. While the range of depth values is from 0 to 255, only 5 depth values (i.e., 50, 108, 110, 112 and 200) appear in the picture. Accordingly, the DLT consists of 5 values with indexes from 0 to 4. The DLT is signaled in the picture parameter set (PPS) and it is up to the encoder to generate the DLT.

According to the current HTM, as many as 24 or more depth pictures in a sample picture set for a view are analyzed first before the encoding process starts. All the depth values appearing in the sample picture set are included in the DLT for this view. This approach imposes a high encoding latency and cannot adapt well to the dynamic environment such as scene change.

It is desirable to develop a method for IC and/or DLT coding that does not suffer from long latency for the IC and/or DLT design at the encoder side.

BRIEF SUMMARY OF THE INVENTION

A method and apparatus for low-latency illumination compensation in a three-dimensional (3D) and multi-view coding system are disclosed. According to the present invention, the encoder determines whether to enable or disable the illumination compensation for the current picture or slice based on a condition related to statistic associated with a selected reference picture or slice respectively, or related to high-level coding information associated with the current picture or slice respectively. The high-level coding information associated with the current picture or slice excludes any information related to pixel values of the current picture or slice respectively. The illumination compensation is them applied according to the decision made by the encoder.

In one embodiment, the selected reference picture or slice corresponds to a latest reconstructed picture or slice with a first temporal ID smaller than a second temporal ID of the current picture or slice respectively. The statistic of the selected reference picture corresponds to a coding unit (CU) level enabling ratio of the latest reconstructed picture and the condition corresponds to whether the CU level enabling ratio is larger than a threshold. The CU level enabling ratio corresponds to a ratio of a first number of coding units (CUs) of the latest reconstructed picture or slice with the illumination compensation enabled and a second number of CUs of the latest reconstructed picture or slice with an IC flag to indicate whether the illumination compensation is enabled or disabled. If the condition is asserted, the illumination compensation for the current picture or slice is enabled, and if the condition is not asserted, the illumination compensation for the current picture or slice is disabled.

The selected reference picture or slice may correspond to a latest reconstructed picture or slice with a first quantization parameter (QP) smaller than a second QP of the current picture or slice respectively. The statistic of the selected reference picture may also correspond to an average pixel difference between the selected reference picture and an inter-view reference picture corresponding to the selected reference picture, and the condition corresponds to whether the average pixel difference is greater than a threshold.

The condition related to the high-level coding information associated with the current picture or slice may correspond to whether there is any inter-view reference picture in a reference list of the current picture or slice respectively. The condition may also correspond to whether there is no temporal reference picture in a reference list of the current picture or slice, or whether a smallest POC distance between the current picture or slice and a temporal reference picture or slice respectively is larger than a threshold.

A method of depth coding using a depth lookup table (DLT) in a three-dimensional (3D) and multi-view coding system is disclosed. The encoder determines the DLT and determines whether to enable or disable DLT coding using the DLT for the current picture or slice based on a condition related to statistic associated with selected reference pictures or slices respectively. The DLT coding is applied to or skipped for the current picture or slice according to the decision made by the encoder.

The selected reference pictures or slices may correspond to previously reconstructed pictures or slices respectively and the previously reconstructed pictures or slices belong to reference pictures of the current picture or slice. In another embodiment, any previously reconstructed pictures or slices can be used regardless whether the previously reconstructed pictures or slices belong to reference pictures of the current picture or slice. The previously reconstructed pictures or slices may be in a same view or different view of the current picture or slice respectively. If the selected reference pictures or slices do not exist, the DLT coding can be disabled for the current picture or slice, or the DLT coding can be applied to the current picture or slice using a default DLT.

The DLT can also be used by a next picture or slice following the current picture or slice respectively in a coding order or displaying order for the DLT coding. When the DLT is used by the next picture or slice, only depth values appearing in the selected reference pictures or slices will be included in the DLT. The DLT coding is disabled for the current picture or slice, or the next picture or slice if a number of appearing depth values is greater than a threshold that is greater than 0 and lower than a maximum value of depth values.

DETAILED DESCRIPTION OF THE INVENTION

As mentioned before, the existing IC and DLT design suffer long latency and it is desirable to develop a method to overcome the long latency issue associated with IC and DLT design at the encoder side. The following description is of the best-contemplated mode of carrying out the invention. This description is made for the purpose of illustrating the general principles of the invention and should not be taken in a limiting sense. The scope of the invention is best determined by reference to the appended claims.

Encoder Decision of Illumination Compensation (IC)

In order to overcome the long latency issue associated with the existing IC and DLT design in the encoder side, embodiments of the present invention decide whether IC is enabled or disabled for the current picture/slice according to a condition related to information of selected reference pictures/slices (i.e., decoded pictures/slices) or a high level coding information of the current picture/slice without accessing the pixel values of the current picture/slice to attain low latency IC encoding. Various embodiments are illustrated as follows.

Embodiment 1: IC Decision Based on Selected Reference Pictures/Slices

According to this embodiment, an encoder simply decides whether IC is enabled or disabled for the current picture/slice depending on the statistics of the selected reference pictures/slices. The selected reference pictures/slices may correspond to previously reconstructed pictures/slices. If no selected reference pictures/slices is found, the slice level IC enabling flag is set to a default value (either enable or disable) for the current picture/slice.

Various statistics can be collected based on the selected pictures/slices. For example, the statistics may correspond to:

The enabling ratio of CU level IC flag. If the IC enabling ratio of the selected reference picture is larger than a predefined threshold, IC is set as enabled for the current picture/slice; otherwise, IC is set as disabled for the current picture/slice. The CU level enabling ratio is defined as a ratio of a first number of coding units (CUs) of the latest reconstructed picture or slice with the illumination compensation enabled and a second number of CUs of the latest reconstructed picture or slice having an IC flag to indicate whether the illumination compensation is enabled or disabled The average pixel difference of the selected reference picture and its inter-view reference picture. If average pixel value between the selected reference picture and its inter-view reference picture is larger than a predefined threshold, IC is set as enabled for coding current picture/slice; otherwise, IC is set as disabled for the current picture/slice.

Various reference pictures/slices can be used as the "selected reference pictures/slices". For example, the selected reference pictures/slices can be:

the latest reconstructed picture/slice, the latest reconstructed picture/slice with the temporal ID smaller than the temporal ID of the current picture/slice, the latest reconstructed picture/slice with the temporal ID smaller than or equal to the temporal ID of the current picture/slice, the latest reconstructed picture/slice with QP smaller than the QP of the current picture/slice, or the latest reconstructed picture/slice with QP smaller than or equal to the QP of the current picture/slice.

Embodiment 2: IC Decision Based on High Level Coding Information of the Current Pictures/Slices According to this embodiment, the encoder simply decides whether IC is enabled or disabled for the current picture/slice depending on a condition related to the high level coding information of the current pictures/slices. The high level coding information may correspond to:

- If no inter-view reference picture exists in the reference picture list of current picture/slice, IC is set as disabled for the current picture/slice; otherwise, IC is set as enabled for the current picture/slice.
- If no temporal reference picture exists in the reference picture list of the current picture/slice and only inter-view reference picture in the list, IC is set as enabled for the current picture/slice.
- If the smallest POC distance between the current picture/slice and the temporal reference pictures is larger than a threshold, IC is set as enabled for the current picture/slice; otherwise, IC is set as disabled for the current picture/slice. If no temporal reference picture exists, the smallest POC distance is inferred as a default value larger than the defined threshold.
- If current picture/slice is an anchor picture/slice, IC is set as enabled for the current picture/slice; otherwise, IC is set as disabled for the current picture/slice.
- If the QP of the current picture/slice is larger than a threshold, IC is set as enabled for the current picture/slice; otherwise, IC is set as disabled for the current picture/slice.
- IC is set as enabled for the pictures/slice with the temporal id equal to 0.
- IC is set as enabled periodically for the pictures/slice. The period can be N picture order count (POC), where N is a positive integer.
- IC is set as enabled according to the slice TYPE. For example, IC is only enabled for B slices.

Embodiment 3: Single Sample Mode Decision Based on Selected Pictures/Slices

A coding method using a single sample value to represent a smooth area of video data (either depth data of screen content data) termed as "Single Sample Mode" or "Single Sample CodingMode" has been disclosed in a co-pending application. When a block is coded in the Single Sample Coding Mode, a whole current block is coded as a single pixel value. In other words, when a block coded in the Single Sample Coding Mode, the whole block is reconstructed by filling all pixels in the block with a single sample value (i.e., either a depth value or a pixel value). The pixel may correspond to any color format (e.g., YUV444, YUV420, YUV422, YUV400 or RGB).

According to Embodiment 3, the encoder simply decides whether Single Sample Mode is enabled or disabled for current picture/slice depending on the statistics of the selected reference pictures/slices and the high level coding information of the current pictures/slices. Various statistics of selected reference pictures/slices and the high level coding information of the current pictures/slices disclosed above for IC decision in Embodiment 1 are also applicable to Embodiment 3.

Examples of IC decision according to the present invention are disclosed as follows:

IC decision Example 1. If no inter-view reference picture exists in the reference picture list of the current picture/slice, IC is set as disabled for the current picture/slice; otherwise, the encoder selects the latest reconstructed picture/slice with temporal ID smaller than the temporal ID of the current picture/slice as the selected reference picture. The encoder then checks whether the IC enabling ratio is larger than a threshold in the selected reference picture. If the IC enabling ratio is larger than the threshold, IC is set as enabled for the current picture/slice; otherwise, IC is set as disabled for the current picture/slice. If no selected reference picture can be found, IC is set as enabled for the current picture/slice.

IC decision Example 2. If no inter-view reference picture exists in the reference picture list of the current picture/slice, IC is set as disabled for the current picture/slice; otherwise, the encoder selects the latest reconstructed picture/slice with QP smaller than the QP of the current picture/slice as the selected reference picture. The encoder then checks whether the IC enabling ratio is larger than a threshold in the selected reference picture. If the IC enabling ratio is larger than the threshold, IC is set as enabled for the current picture/slice; otherwise, IC is set as disabled for the current picture/slice. If no selected reference picture could be found, IC is set as enabled for the current picture/slice.

IC decision Example 3. If the smallest POC distance between the current picture/slice and the temporal reference pictures is larger than a threshold, IC is set as enabled for the current picture/slice; otherwise, IC is set as disabled for the current picture/slice. If no temporal reference picture exists, the smallest POC distance is inferred as a default value larger than the defined threshold.

Embodiment 4: DLT Decision Based on the Statistics of the Selected Reference Pictures/Slices According to this embodiment, the encoder determines the DLT and determines whether to use the DLT for the current picture/slice depending on the statistics of the selected reference pictures/slices. The selected reference pictures/slices may correspond to previously reconstructed pictures/slices. If no selected reference pictures/slices can be found, the encoder may take one of the following steps:

- turning off the DLT for the current picture/slice;
- deriving the DLT the for current picture/slice depending on the statistics of the current picture/slice;
- utilizing a default DLT; or
- deriving the DLT for current picture/slice depending on the statistics of a previously reconstructed picture/slice that is not the reference pictures/slices for the current picture.

Embodiment 5: DLT Decision Based on the Statistics of a Previously Reconstructed Pictures/Slices According to this embodiment, the encoder determines the DLT and determines whether to use the DLT for the current picture/slice depending on the statistics of a previously reconstructed picture/slice regardless whether it is a reference picture/slice for the current picture/slice or not.

Embodiment 6: DLT Decision Based on the Statistics of Two or More Selected Reference Pictures/Slices According to this embodiment, the encoder determines the DLT and determines whether to use the DLT for the current picture/slice depending on the statistics of two or more selected reference pictures/slices. The selected reference pictures/slices are previously reconstructed pictures/ slices. If no selected reference pictures/slices can be found, the encoder may take one of the following steps:
- turning off the DLT for the current picture/slice;
- determining the DLT for current picture/slice depending on the statistics of the current picture/slice;
- utilizing a default DLT; or
- determining the DLT for the current picture/slice depending on the statistics of one, two or more previously reconstructed picture/slices which are not the reference pictures/slices for the current picture.

Embodiment 7: DLT Decision Based on the Statistics of Two or More Previously Reconstructed Pictures/Slices According to this embodiment, the encoder determines the DLT for the current picture/slice depending on the statistics of two or more previously reconstructed picture/slices regardless whether the two or more previously reconstructed picture/slices are reference pictures/slices for the current picture/slice or not.

The previously reconstructed picture used to derive the DLT for the current picture/slice in Embodiment 4 to Embodiment 7 can be in the same view or different view of the current picture.

Also, the DLT obtained in embodiment 4 to embodiment 7 can be used by one or more pictures/slices following the current picture in coding order or displaying order.

In Embodiment 4 to Embodiment 7, depth values appearing in the previously reconstructed picture/slices for statistics are included in the DLT for the current view, while depth values not appearing in statistics of previously reconstructed picture/slices are not included in the DLT for the current view. Furthermore, only parts of previously reconstructed picture/slices can be used for statistics. Depth values appearing in the specific parts in previously reconstructed picture/slices for statistics are included in the DLT for the current view, while values not appearing in the specific parts in statistics previously reconstructed picture/slices are not included into DLT for the current view.

In the above embodiments related to DLT decision, the statistics can be done on the original pictures/slices instead of the reconstructed pictures/slices. Also, the DLT can be turned off for the current picture/slice or for more pictures/slices following the current picture if the number of appearing values is greater than a number M, where M is greater than 0 and smaller than MaxDepthValue corresponding to the maximum value for depth samples. For example, M can be MaxDepthValue/2 or (MaxDepthValue+1)/2.

Examples of DLT Decision According to the Present Invention

Figure 4:
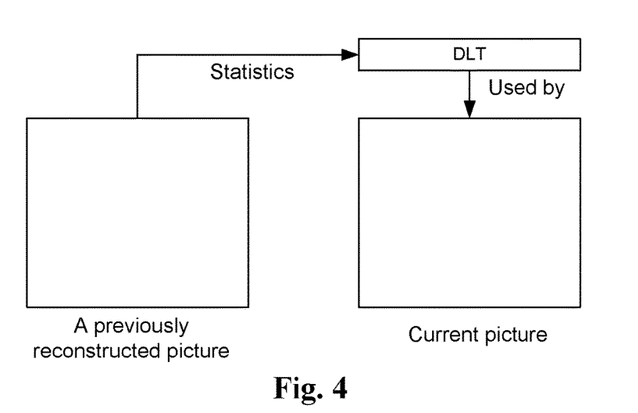
FIG. 4 illustrates an example of DLT derivation for the current picture based on the statistics of a previously reconstructed picture.

FIG. 4 illustrates an example of DLT derivation for the current picture based on the statistics of a previously reconstructed picture. Since the DLT is derived from the previously reconstructed picture for the current picture, there is no need to wait for gathering all depth values in the current picture for determining the DLT. Accordingly, the processing latency for the DLT is reduced.

Figure 5:
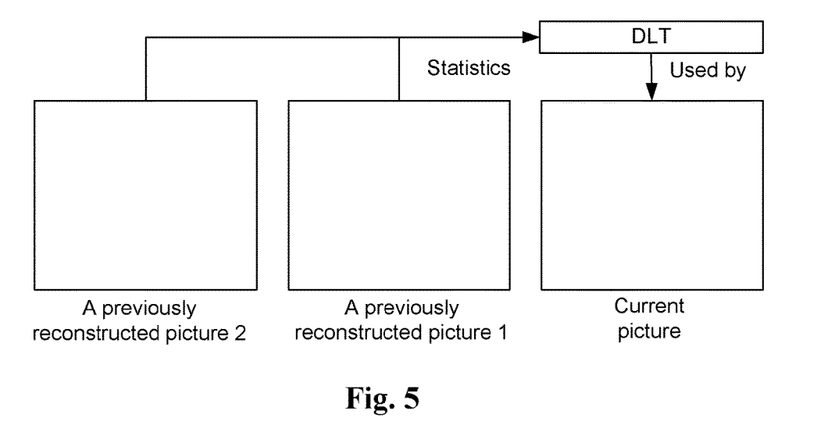
FIG. 5 illustrates an example of DLT derivation for the current picture based on the statistics of two previously reconstructed pictures.

FIG. 5 illustrates an example of DLT derivation for the current picture based on the statistics of two previously reconstructed pictures. Again, there is no need to wait for gathering all depth values in the current picture for determining the DLT. Accordingly, the processing latency for the DLT is reduced.

Figure 6:
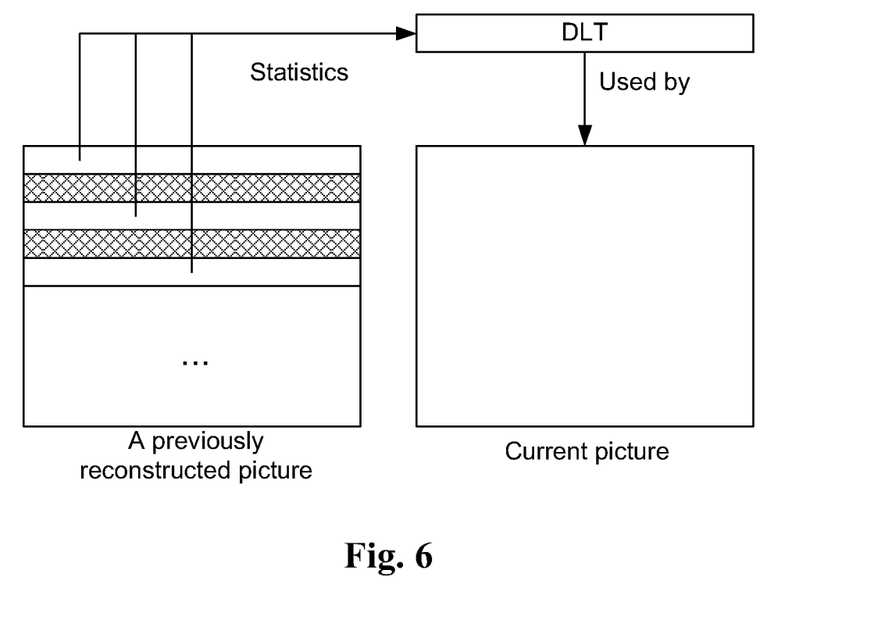
FIG. 6 illustrates an example of DLT derivation for the current picture based on statistics of every other row of a previously reconstructed picture.

FIG. 6 illustrates an example of DLT derivation for the current picture based on statistics of every other row in each reconstructed picture. Compared to the approach in FIG. 4, the approach in FIG. 6 uses only half of the samples in the previously reconstructed picture.

Figure 7:
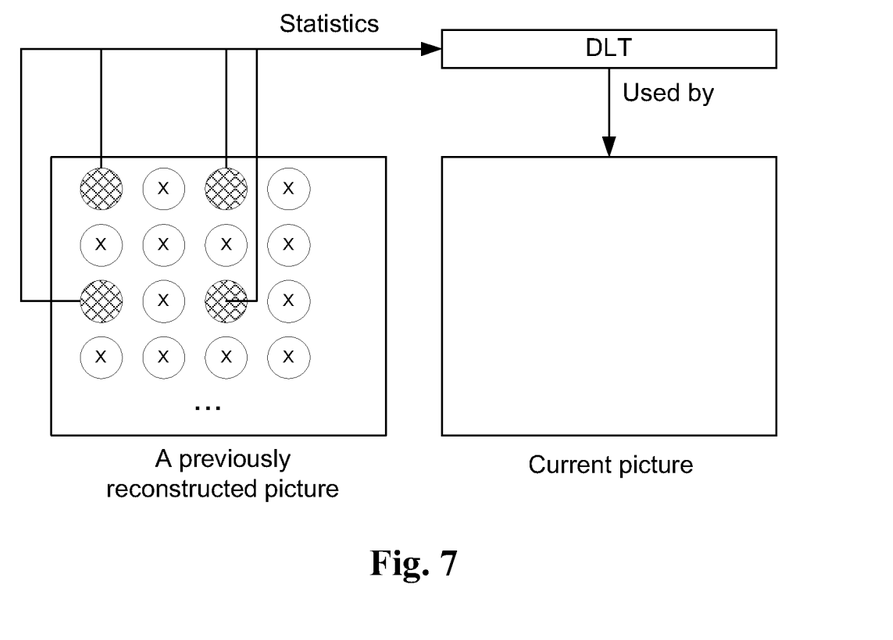
FIG. 7 illustrates an example of DLT derivation for the current picture based on statistics of one out of every four depth samples in a previously reconstructed picture.

FIG. 7 illustrates an example of DLT derivation for the current picture based on statistics of one out of every four samples in a previously reconstructed. Compared to the approach in FIG. 4, the approach in FIG. 7 uses only one quarter of the samples in the previously reconstructed picture.

The performance of a 3D/multi-view video coding system incorporating low-latency illumination compensation according to an embodiment of the present invention is compared to that of a conventional system based on HTM-10.0 as shown in Table 1. The performance comparison is based on different sets of test data listed in the first column. In the conventional system based on HTM-10.0, the IC decision utilizes samples in the current picture, which caused a frame delay. On the other hand, the system incorporating an embodiment of the present invention utilizes samples from a preciously reconstructed picture for IC enable/disable decision. The BD-rate differences are shown for texture pictures in views 0/1/2 1 (video 0/1/2). A negative value in the BD-rate implies that the present invention has a better performance. The second group of performance is the bitrate measure for texture video only (video/video bitrate), the total bitrate (texture bitrate and depth bitrate) for texture video (video/total bitrate) and the total bitrate for coded and synthesized video (synth/total bitrate). As shown in Table 1, the average performance is about the same as the conventional HTM-10.0. In other words, there is no performance degradation by using the low-latency IC according to the embodiment of the present invention. The processing times (encoding time, decoding time and rendering time) are also compared.

TABLE 1

|  | Video 0 | Video 1 | Video 2 | Video PSNR/ video bitrate | Video PSNR/ total bitrate | Synth PSNR/ total bitrate | Enc time | Dec time | Ren time |
| --- | --- | --- | --- | --- | --- | --- | --- | --- | --- |
| Balloons | 0.0% | 0.0% | 0.0% | 0.0% | 0.0% | 0.0% | 94.9% | 102.8% | 99.2% |
| Kendo | 0.0% | 0.0% | 0.0% | 0.0% | 0.0% | 0.0% | 97.0% | 98.2% | 100.0% |
| Newspapercc | 0.0% | −0.2% | −0.1% | 0.0% | 0.0% | −0.1% | 99.0% | 98.7% | 99.2% |
| GhostTownFly | 0.0% | 0.2% | 0.1% | 0.0% | 0.0% | 0.0% | 102.9% | 99.5% | 100.6% |
| PoznanHall2 | 0.0% | −0.1% | 0.0% | 0.0% | 0.0% | −0.1% | 98.4% | 98.2% | 97.6% |
| PoznanStreet | 0.0% | −0.1% | −0.1% | 0.0% | 0.0% | 0.0% | 97.6% | 100.6% | 100.5% |
| UndoDancer | 0.0% | −0.1% | 0.0% | 0.0% | 0.0% | 0.0% | 95.4% | 101.6% | 100.2% |
| Shark | 0.0% | −0.1% | −0.1% | 0.0% | 0.0% | −0.1% | 102.1% | 93.9% | 100.2% |
| 1024 × 768 | 0.0% | −0.1% | 0.0% | 0.0% | 0.0% | 0.0% | 96.9% | 99.9% | 99.5% |

TABLE 1-continued

| | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| 1920 × 1088 | 0.0% | 0.0% | 0.0% | 0.0% | 0.0% | 0.0% | 99.3% | 98.8% | 99.8% |
| average | 0.0% | −0.1% | 0.0% | 0.0% | 0.0% | 0.0% | 98.4% | 99.2% | 99.7% |

Figure 8:
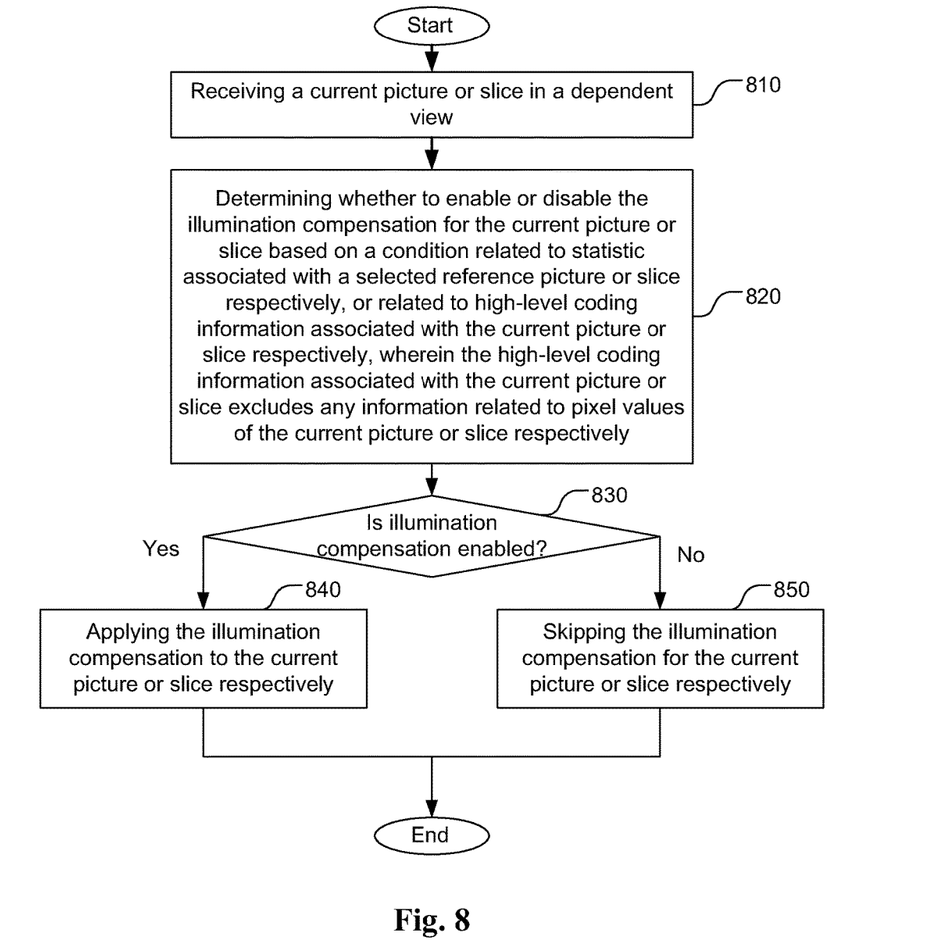
FIG. 8 illustrates an exemplary flowchart for low-latency illumination compensation in a three-dimensional (3D) and multi-view coding system according to an embodiment of the present invention.

FIG. 8 illustrates an exemplary flowchart for low-latency illumination compensation in a three-dimensional (3D) and multi-view coding system according to an embodiment of the present invention. The system receives a current picture or slice in a dependent view as shown in step 810. The current picture or slice in a dependent view may be retrieved from memory (e.g., computer memory, buffer (RAM or DRAM) or other media) or from a processor. The system determines whether to enable or disable the illumination compensation for the current picture or slice based on a condition related to statistic associated with a selected reference picture or slice respectively, or related to high-level coding information associated with the current picture or slice respectively as shown in step 820. The high-level coding information associated with the current picture or slice excludes any information related to pixel values of the current picture or slice respectively. Whether the illumination compensation is enabled is checked in step 830. If the result is "Yes", the illumination compensation is applied to the current picture or slice respectively as shown in step 840. If the result is "No", the illumination compensation is skipped for the current picture or slice respectively as shown in step 850.

Figure 9:
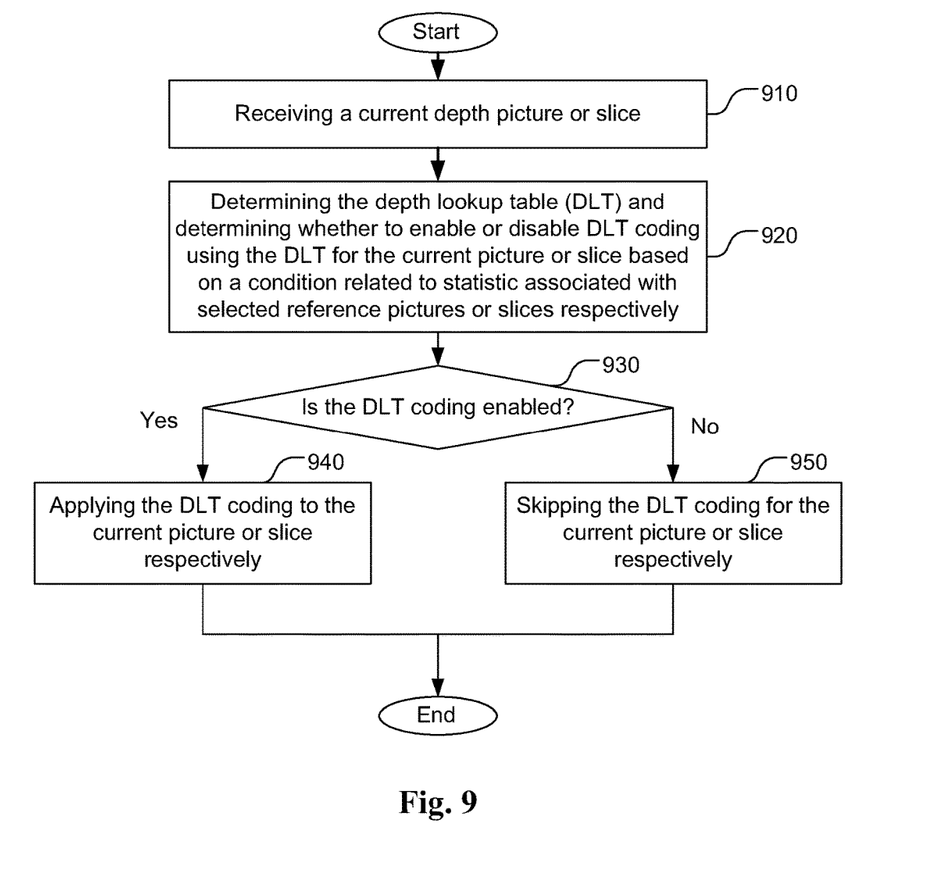
FIG. 9 illustrates an exemplary flowchart for low-latency depth lookup table based coding in a three-dimensional (3D) and multi-view coding system according to an embodiment of the present invention.

FIG. 9 illustrates an exemplary flowchart for low-latency depth lookup table based coding in a three-dimensional (3D) and multi-view coding system according to an embodiment of the present invention. The system receives a current depth picture or slice as shown in step 910. The system determines the DLT and whether to enable or disable DLT coding using the DLT for the current picture or slice based on a condition related to statistic associated with selected reference pictures or slices respectively as shown in step 920. Whether the DLT coding is enabled is checked in step 930. If the result is "Yes", the DLT coding is applied to the current picture or slice respectively as shown in step 940. If the result is "No", the DLT coding is skipped for the current picture or slice respectively as shown in step 950.

The flowcharts shown above are intended to illustrate an example of 3D/multi-view coding using low-latency illumination compensation and DLT coding respectively in three-dimensional and multi-view coding. A person skilled in the art may modify each step, re-arranges the steps, split a step, or combine steps to practice the present invention without departing from the spirit of the present invention The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of illumination compensation in a three-dimensional (3D) and multi-view coding system, the method comprising:

receiving plural pictures or slices in a dependent view;

determining whether to enable or disable the illumination compensation for a first or second current picture or slice of the plural pictures or slices based on a condition related to high-level coding information associated with the first or second current picture or slice respectively, wherein the high-level coding information associated with the first or second current picture or slice excludes any information related to pixel values of the first or second current picture or slice respectively, wherein the condition related to the high-level coding information associated with the first or second current picture or slice corresponds to whether a smallest POC distance between the first or second current picture or slice and a temporal reference picture or slice respectively is larger than a threshold;

for the first current picture or slice where the illumination compensation is enabled, applying the illumination compensation to the first current picture or slice respectively; and for the second picture or slice where the illumination compensation is disabled, skipping the illumination compensation for the second current picture or slice respectively.

2. The method of claim 1, wherein the selected reference picture or slice corresponds to a latest reconstructed picture or slice with a first temporal ID smaller than a second temporal ID of the first or second current picture or slice respectively.

3. The method of claim 2, wherein the determining is further based on a condition related to statistic associated with a selected reference picture or slice respectively, wherein the statistic of the selected reference picture corresponds to a coding unit (CU) level enabling ratio of the latest reconstructed picture and the condition corresponds to whether the CU level enabling ratio is larger than a threshold, wherein the CU level enabling ratio corresponds to a ratio of a first number of coding units (CUs) of the latest reconstructed picture or slice with the illumination compensation enabled and a second number of CUs of the latest reconstructed picture or slice with an IC flag to indicate whether the illumination compensation is enabled or disabled.

4. The method of claim 3, wherein if the condition is asserted, the illumination compensation for the first or second current picture or slice is enabled, and if the condition is not asserted, the illumination compensation for the first or second current picture or slice is disabled.

5. The method of claim 1, wherein the selected reference picture or slice corresponds to a latest reconstructed picture or slice with a first quantization parameter (QP) smaller than a second QP of the first or second current picture or slice respectively.

6. The method of claim 1, wherein the determining is further based on a condition related to statistic associated with a selected reference picture or slice respectively, wherein the statistic of the selected reference picture corresponds to a coding unit (CU) level enabling ratio of the selected reference picture and the condition corresponds to whether the CU level enabling ratio is larger than a threshold, wherein the CU level enabling ratio corresponds to a ratio of a first number of coding units (CUs) of the selected reference picture or slice with the illumination compensation enabled and a second number of CUs of the selected reference picture or slice with an IC flag to indicate whether the illumination compensation is enabled or disabled.

7. The method of claim 1, wherein the determining is further based on a condition related to statistic associated with a selected reference picture or slice respectively, wherein the statistic of the selected reference picture corresponds to an average pixel difference between the selected reference picture and an inter-view reference picture corresponding to the selected reference picture, and the condition corresponds to whether the average pixel difference is greater than a threshold.

8. The method of claim 1, wherein the condition related to the high-level coding information associated with the first or second current picture or slice corresponds to whether there is any inter-view reference picture in a reference list of the first or second current picture or slice respectively.

9. The method of claim 1, wherein the condition related to the high-level coding information associated with the first or second current picture or slice corresponds to whether there is no temporal reference picture in a reference list of the first or second current picture or slice respectively.

10. The method of claim 1, wherein if the condition is asserted, the illumination compensation for the first or second current picture or slice is enabled, and if the condition is not asserted, the illumination compensation for the first or second current picture or slice is disabled.

11. An apparatus for illumination compensation in a three-dimensional (3D) and multi-view coding system, the apparatus comprising one or more electronic circuits configured to:

receive plural pictures or slices in a dependent view;

determine whether to enable or disable the illumination compensation for a first or second current picture or slice based on a condition related to high-level coding information associated with the first or second current picture or slice respectively, wherein the high-level coding information associated with the first or second current picture or slice excludes any information related to depth values of the first or second current picture or slice respectively, wherein the condition related to the high-level coding information associated with the first or second current picture or slice corresponds to whether a smallest POC distance between the first or second current picture or slice and a temporal reference picture or slice respectively is larger than a threshold;

for the first current picture or slice where the illumination compensation is enabled, apply the illumination compensation to the first current picture or slice respectively; and for the second picture or slice where the illumination compensation is disabled, skip the illumination compensation for the second current picture or slice respectively.

12. The apparatus of claim 11, wherein the selected reference picture or slice corresponds to a latest reconstructed picture or slice with a first temporal ID smaller than a second temporal ID of the first or second current picture or slice respectively.

13. The apparatus of claim 12, wherein the one or more electronic circuits are configured to determine further based on a condition related to statistic associated with a selected reference picture or slice respectively, wherein the statistic of the selected reference picture corresponds to a coding unit (CU) level enabling ratio of the latest reconstructed picture and the condition corresponds to whether the CU level enabling ratio is larger than a threshold, wherein the CU level enabling ratio corresponds to a ratio of a first number of coding units (CUs) of the latest reconstructed picture or slice with the illumination compensation enabled and a second number of CUs of the latest reconstructed picture or slice with an IC flag to indicate whether the illumination compensation is enabled or disabled.

14. The apparatus of claim 13, wherein if the condition is asserted, the illumination compensation for the first or second current picture or slice is enabled, and if the condition is not asserted, the illumination compensation for the first or second current picture or slice is disabled.

15. The apparatus of claim 11, wherein the selected reference picture or slice corresponds to a latest reconstructed picture or slice with a first quantization parameter (QP) smaller than a second QP of the first or second current picture or slice respectively.

16. The apparatus of claim 11, wherein the one or more electronic circuits are configured to determine further based on a condition related to statistic associated with a selected reference picture or slice respectively, wherein the statistic of the selected reference picture corresponds to a coding unit (CU) level enabling ratio of the selected reference picture and the condition corresponds to whether the CU level enabling ratio is larger than a threshold, wherein the CU level enabling ratio corresponds to a ratio of a first number of coding units (CUs) of the selected reference picture or slice with the illumination compensation enabled and a second number of CUs of the selected reference picture or slice with an IC flag to indicate whether the illumination compensation is enabled or disabled.

17. The apparatus of claim 11, wherein the one or more electronic circuits are configured to determine further based on a condition related to statistic associated with a selected reference picture or slice respectively, wherein the statistic of the selected reference picture corresponds to an average pixel difference between the selected reference picture and an inter-view reference picture corresponding to the selected reference picture, and the condition corresponds to whether the average pixel difference is greater than a threshold.

18. The apparatus of claim 11, wherein the condition related to the high-level coding information associated with the first or second current picture or slice corresponds to whether there is any inter-view reference picture in a reference list of the first or second current picture or slice respectively.

19. The apparatus of claim 11, wherein the condition related to the high-level coding information associated with the first or second current picture or slice corresponds to whether there is no temporal reference picture in a reference list of the first or second current picture or slice respectively.

20. A non-transitory machine-readable medium comprising machine-readable software code that, when executed by one or more processors, causes the one or more processors to execute the following method:

receiving plural pictures or slices in a dependent view;

determining whether to enable or disable the illumination compensation for a first or second current picture or slice of the plural pictures or slices based on a condition related to high-level coding information associated with the first or second current picture or slice respectively, wherein the high-level coding information associated with the first or second current picture or slice excludes any information related to pixel values of the first or second current picture or slice respectively, wherein the condition related to the high-level coding information associated with the first or second current picture or slice corresponds to whether a smallest POC distance between the first or second current picture or slice and a temporal reference picture or slice respectively is larger than a threshold;

for the first current picture or slice where the illumination compensation is enabled, applying the illumination compensation to the first current picture or slice respectively; and for the second picture or slice where the illumination compensation is disabled, skipping the illumination compensation for the second current picture or slice respectively.

* * * * *